United States Patent
Fernandez

(12) 
(10) Patent No.: US 6,349,502 B1
(45) Date of Patent: Feb. 26, 2002

(54) CAGE FOR SUPPORTING VEGETABLE PLANTS IN GARDEN

(76) Inventor: Vincent O. Fernandez, 218 Grand Ave., Scott City, MO (US) 63780

( * ) Notice: Subject to any disclaimer, the term of this patent is extended or adjusted under 35 U.S.C. 154(b) by 0 days.

(21) Appl. No.: 09/615,644

(22) Filed: Jul. 13, 2000

(51) Int. Cl.[7] ................................................ A01G 9/12
(52) U.S. Cl. ........................................................ 47/45
(58) Field of Search ................................ 47/45, 44, 47

(56) References Cited

U.S. PATENT DOCUMENTS

| | | | |
|---|---|---|---|
| 134,828 A | | 1/1873 | Watson |
| 1,730,285 A | | 10/1929 | Nichols et al. |
| 2,011,990 A | | 8/1935 | Aldridge |
| 3,088,245 A | | 5/1963 | Menge |
| 3,174,255 A | | 3/1965 | Knell |
| 3,299,569 A | | 1/1967 | Lemrick |
| 3,934,879 A | | 1/1976 | Curtiss et al. |
| 5,048,231 A | | 9/1991 | Brown |
| 5,099,602 A | | 3/1992 | Arnold, Sr. et al. |
| 5,174,060 A | * | 12/1992 | Glamos .................. 47/45 |
| 5,179,799 A | * | 1/1993 | Hillestad ................ 47/45 |
| 5,252,072 A | | 10/1993 | Sasaki |
| 5,412,905 A | * | 5/1995 | Allison .................. 47/45 |
| 5,473,839 A | | 12/1995 | Stidham |
| 5,595,019 A | | 1/1997 | Foreman |
| 5,640,802 A | * | 6/1997 | Elliot .................... 47/45 |

FOREIGN PATENT DOCUMENTS

| | | | |
|---|---|---|---|
| CH | 638077 A | * | 3/1987 |
| FR | 2572250 A1 | * | 5/1986 |
| FR | 2587586 A | * | 3/1987 |
| GB | 328438 | | 5/1930 |

* cited by examiner

*Primary Examiner*—Charles T. Jordan
*Assistant Examiner*—Jeffrey L. Gellner
(74) *Attorney, Agent, or Firm*—Howell & Haferkamp, LC

(57) ABSTRACT

A plant support for supporting plants that can be inserted into the soil without deforming. The support comprises a plurality of vertical members with opposite top and bottom ends. The bottom ends are adapted to engage with and penetrate into the earth to anchor the plant support to the earth. There are at least two horizontal members having differing vertical cross-sectional diameters. The horizontal members are vertically spaced apart and attached to the vertical members along the length of the vertical members. The horizontal member attached to the vertical members closest to the bottom ends is a bottom horizontal member and has a vertical cross-sectional diameter that is larger than the other horizontal members. The horizontal members have a central opening dimensioned to allow a plant to grow through the central opening and be supported by the horizontal members. The bottom horizontal member is dimensioned and adapted to cause the vertical member bottom ends to penetrate into and engage with the earth when the bottom horizontal member is stepped on by a user to thereby anchor the plant support to the earth and provide a support for the plant.

14 Claims, 2 Drawing Sheets

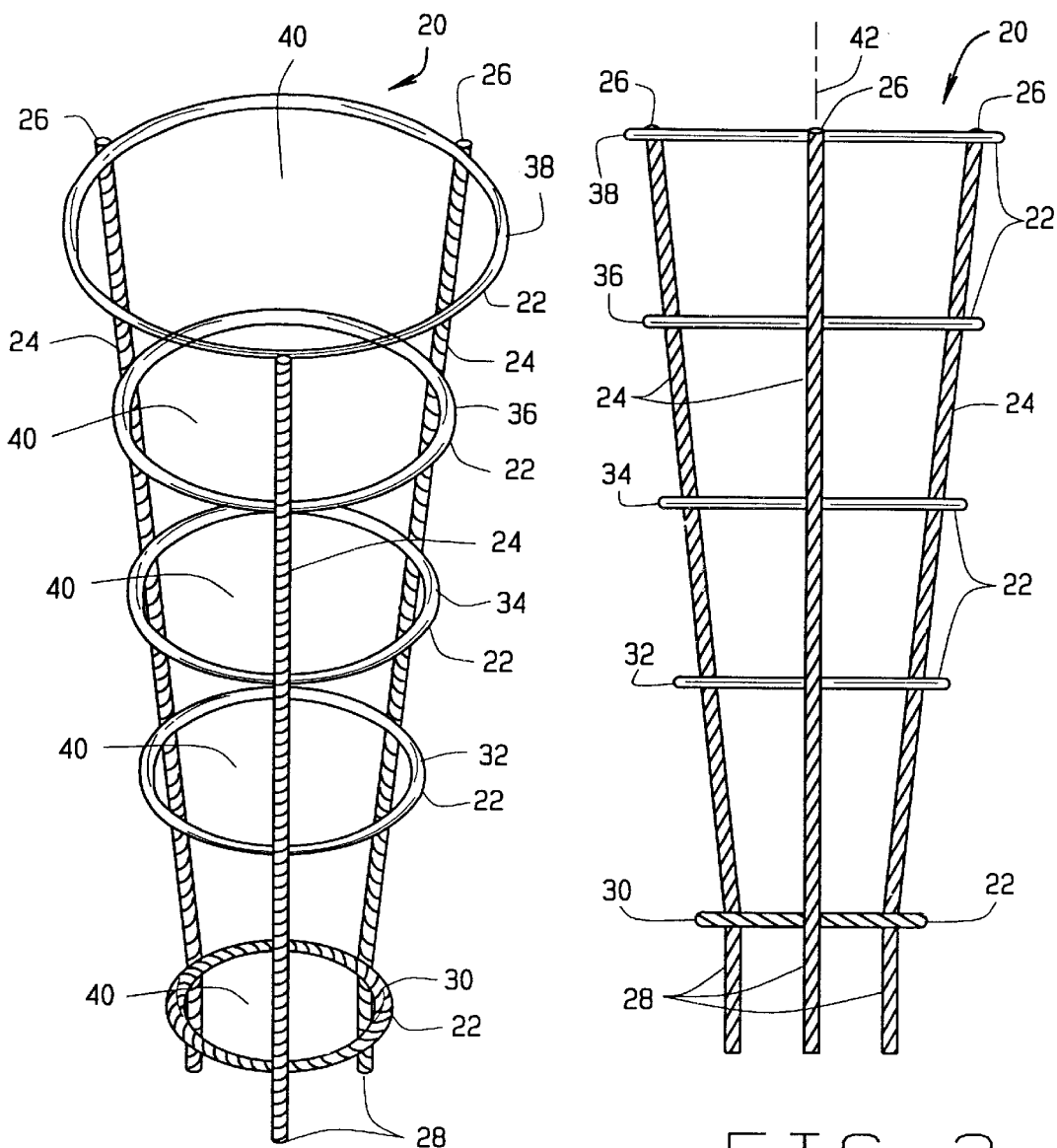
FIG. 1
FIG. 2
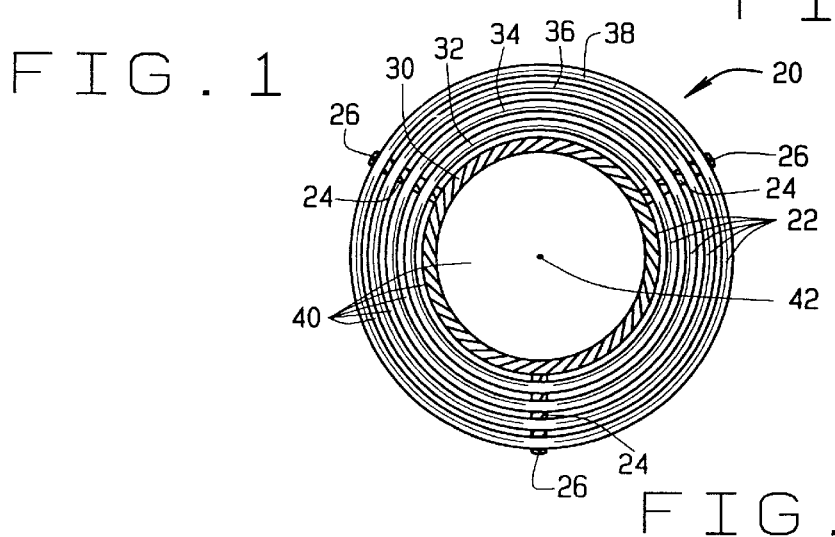
FIG. 3

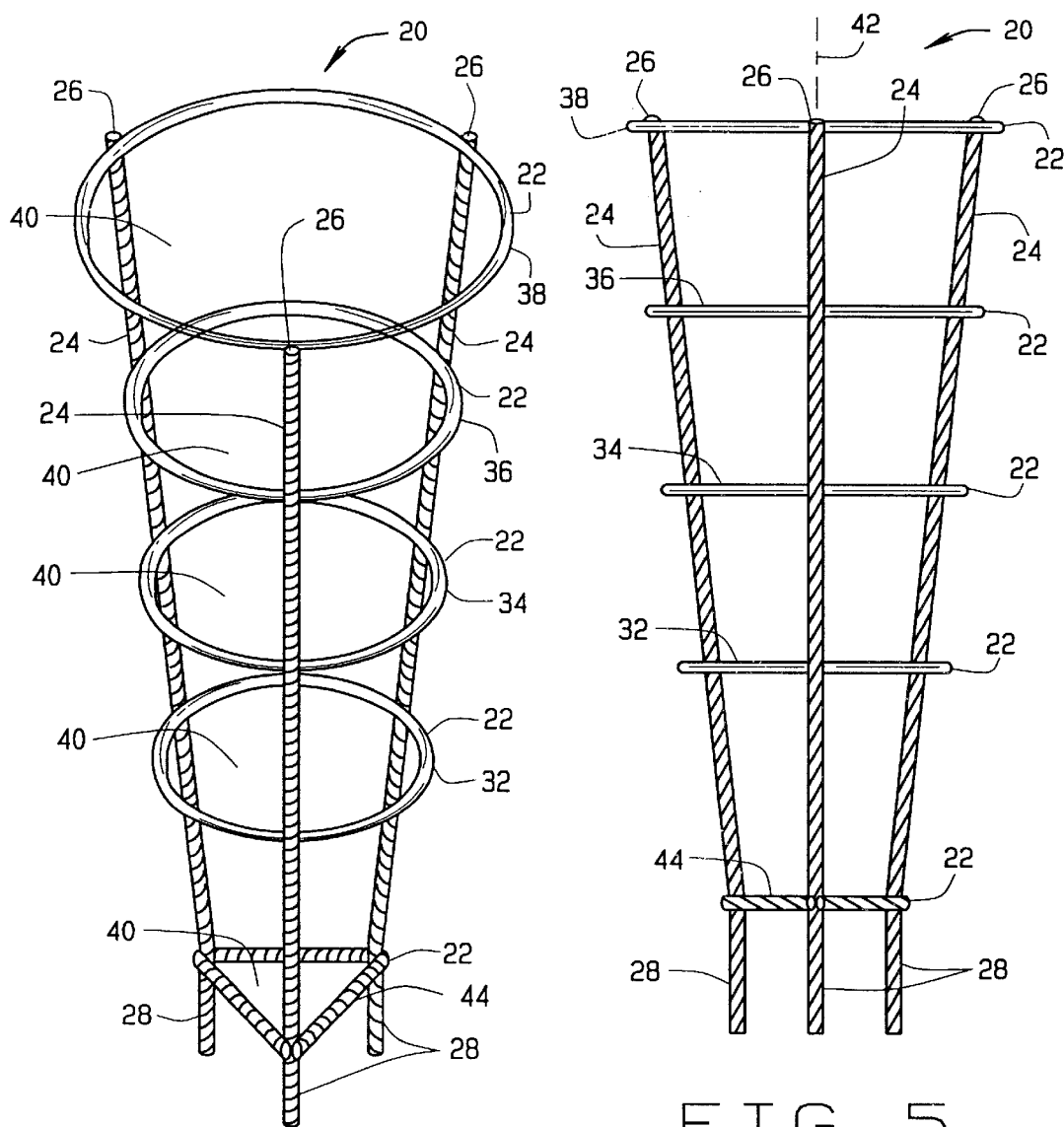
FIG. 4
FIG. 5
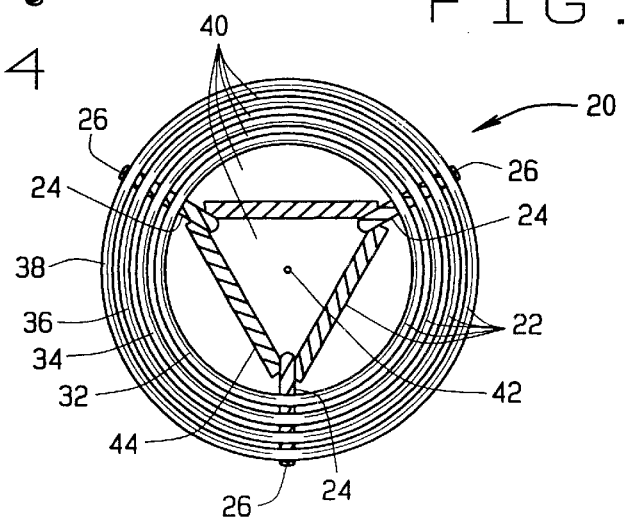
FIG. 6

CAGE FOR SUPPORTING VEGETABLE PLANTS IN GARDEN

BACKGROUND OF THE INVENTION (i) Field of the Invention

The present invention relates generally to plant supports. In particular, the present invention relates to a plant support that utilizes a horizontal member that is dimensioned and adapted to allow the plant support to be inserted into the earth by stepping on the horizontal member.

(ii) Description of the Related Art

Plant supports are generally well known in the art. Arguably, the most common and popular prior art plant support is a post that has two ends and a length the re between. The bottom end of the post is inserted into the soil adjacent to a plant growing in the soil. As the plant grows it is tied to the post along its length to provide support for the plant. While the use of a post may be the most popular type of plant support, there are numerous other types of prior art plant supports available that do not require the user to tie the plant to the support as the plant grows.

Typical prior art plant supports include a plurality of vertical members and a plurality of horizontal members. The vertical members have opposite top and bottom ends. The vertical member bottom ends are adapted to be inserted into the soil to thereby anchor the plant support to the earth and enable the plant support to support a plant. Some prior art plant supports have vertical members with pointed or sharpened bottom ends to facilitate the insertion of the vertical members into the soil. Typically, the horizontal members are attached to each vertical member and are arranged so that the horizontal members are vertically spaced along the length of the vertical members. The major drawback of the prior art plant supports is that they are made out of a pliable or flexible material to save costs and for ease of manufacturing, thereby making the prior art plant supports difficult to insert into the soil.

In preparing to use the prior art plant supports, a user positions the plant support over the plant to be supported and attempts to insert the vertical member bottom ends into the soil. Because the vertical members are so flexible, they have a tendency to bend or deform as they are being inserted into the soil. Therefore, the user needs to grasp the plant support vertical members near their bottom ends to insert or force each vertical member bottom end into the soil without bending or distorting the plant support. The requirement of grasping the vertical members near their bottom ends requires the user to bend over and get close to the ground thereby causing stress on the users body and requiring a great amount of effort.

Additionally, because the vertical members are so flexible, the user usually can not insert the vertical members into the soil to the desired depth in a single step without bending or distorting the other vertical members. Therefore, when there is more than one vertical member the process of inserting the plant support into the soil typically requires the user to insert each vertical member individually. The user must partially insert each vertical member into the soil one at a time and continue inserting each vertical member further into the soil in a repetitive manner until the plant support is firmly anchored in the soil and the vertical members are at the desired depth. If the user were to ignore the consecutive and incremental insertions of the vertical members into the soil, the user runs the risk of deforming or bending the plant support while trying to insert the desired vertical member to the preferred depth in a single insertion.

The process of inserting the prior art plant supports into the soil is thereby tedious, difficult, and potentially stressful on a user's body. Additionally, the user runs the risk of bending or deforming the plant support when inserting it into the soil.

The horizontal members of the prior are plant supports are typically round hoops with a large central opening through which the plant may grow. However, some prior art plant supports utilize straight horizontal members. Prior art plant supports that use straight horizontal members are configured to allow a plant to be tied to the horizontal members by rope, twine, string or the like and are similar in nature to the aforesaid posts.

The more common, hoop type horizontal members typically have hoops that increase in diameter as the horizontal members are arranged from the bottom of the plant support to the top of the plant support. The increasing diameter hoops also have an associated increase in their central openings. These types of plant supports are positioned on top of a plant and allow a plant to grow upwardly through the central openings in the horizontal members. The horizontal members thereby provide support for the branches of the plant at various levels and allow for the plant to increase in diameter as the plant grows upwardly. These prior art plant support horizontal members are made of the same flexible and easily bent material as the vertical members. Therefore, the horizontal members also have the tendency to deform during the insertion of the plant support into the soil.

Because the typical prior art plant supports utilize a flexible and easily bent material, the durability of these plant supports is low and the plant supports are typically used only for a few growing seasons. Because the vertical members are so flexible, the user usually can not insert a vertical member into the soil to the desired depth in a single action without bending or distorting the other vertical members. Additionally, the flexible nature of the prior art plant supports require the user to bend over or sit on the ground to grasp each vertical member near the bottom end to insert the vertical members into the soil.

Therefore, what is needed is a plant support that can be inserted into the soil with ease and little effort. The plant support also needs to be able to be inserted into the soil without bending or distorting. Finally, the plant support needs to be easy to manufacture at a reasonable cost.

SUMMARY OF THE INVENTION

The present invention overcomes the shortcomings of prior art plant supports by providing a plant support that is capable of being inserted into the soil in one easy motion. The present invention also provides a plant support that is extremely durable and long lasting. Additionally, the present invention provides for a plant support that can be inserted into the soil with minimal stress on the user's body and without bending or distorting.

The plant support of the invention is comprised of both vertical members and horizontal members. The horizontal members are attached to the vertical members along the length of the vertical members. The horizontal members have central openings that increase in diameter as the horizontal members are vertically spaced along the length of the vertical members from the bottom to the top of the vertical members. The vertical members have bottom ends that are adapted to engage with the soil to anchor the plant support to the soil so that it may support a plant.

In the preferred embodiment, the plant support is comprised of at least one vertical member. The vertical member has opposite top and bottom ends that define a length of the vertical member. The bottom end of the vertical member is adapted to engage with and penetrate into the earth. The plant support also includes at least one horizontal member. The horizontal member is a rigid closed loop that is attached to the vertical member between the top and bottom ends. The closed loop has a central opening dimensioned and adapted to allow a plant to grow through the central opening and to be supported by the closed loop. Additionally, the closed loop is attached to the at least one vertical member at a position dose to the bottom end where it is adapted to cause the vertical member bottom end to penetrate into and engage with the earth when the closed loop is stepped on by a user to thereby anchor the plant support to the earth and provide a support for the plant.

While the at least one horizontal member has been described as being a closed loop, it should be understood that the use of the term closed loop is not intended to convey a particular geometric shape. The term closed loop is to be interpreted as meaning a band, a square, a triangle, a ring, or any geometric closed polygonal shape with a central opening. The term loop is not to be limited to a circular or ring-type configuration.

In the preferred embodiment, the at least one horizontal member is one of a plurality of horizontal members and the at least one vertical member is one of a plurality of vertical members. The horizontal members are arranged in a vertically spaced relation along the length of the vertical members between the top and bottom ends of the vertical members. In one embodiment, the plurality of horizontal members are rings that are concentric around a common vertical central axis. These horizontal rings have progressively differing central opening diameters. The central opening diameters of the rings increase as the rings are arranged along the length of the vertical members with the bottom or lower most ring having a smallest central opening diameter and the top or upper most ring having a largest central opening diameter. Each ring has a vertical cross-sectional diameter. The vertical cross-sectional diameter of the bottom ring is larger than the vertical cross-sectional diameters of the other rings. The larger vertical cross-sectional diameter of the bottom ring providing additional rigidity and structural durability for the plant support and allowing the plant support to be inserted into the earth by a user stepping on the bottom ring. The vertical members are typically made of rods with cross-sectional diameters that are generally the same as the vertical cross-sectional diameter of the lower most ring.

In the preferred embodiment, the vertical members extend upwardly generally parallel to the vertical central axis from their bottom ends to the bottom or lower most ring. This upright, vertical orientation of the vertical member bottom ends facilitates their insertion into the ground without bending. The vertical members then diverge radially outwardly from the vertical central axis as the vertical members extend upwardly from the bottom ring to their top ends.

In another variation of the preferred embodiment, the plurality of horizontal members are comprised of a generally triangular member and a plurality of rings. The triangular member and the rings share a common vertical central axis. The bottom or lower most horizontal member is the triangular member. Again, in this embodiment, the plurality of rings and the triangular member have circular vertical cross-sections. The vertical cross-sectional diameter of the triangular member is again larger than the vertical cross-sectional diameters of the rings. The larger vertical cross-sectional diameter of the triangular member providing additional rigidity and structural durability for the plant support and allowing the plant support to be inserted into the earth by a user stepping on the triangular member.

The plant support of the present invention overcomes the disadvantages of the prior art. The use of the present invention plant support which has a bottom horizontal member that is positioned in close proximity to the bottom end of the vertical member and which is adapted and dimensioned to cause the vertical member bottom end to penetrate into the earth and anchor the plant support when it is stepped on by a user is less difficult to use than prior art plant supports. Because a user only needs to step on the lower most vertical member to insert the plant support into the earth and anchor it, the user is not required to get down on the ground to insert the plant support into the earth. Additionally, because the plant support can be inserted into the earth by stepping on the lower most horizontal member, the user does not need to worry about inserting each vertical member individually into the earth. The extra structural rigidity provided by the larger vertical members and the bottom horizontal member increases the durability of the plant support and increases the life span of the plant support beyond that of typical prior art plant supports. Furthermore, because only the bottom horizontal member needs to have a vertical cross-sectional diameter that is larger than the other horizontal members, the cost of producing the plant support of the present invention is less then the cost of making the entire plant support have the same larger vertical cross-sectional diameters.

BRIEF DESCRIPTION OF THE DRAWINGS

Further objectives and features of the present invention are set forth in the following detailed description of the preferred embodiment of the invention and in the drawing figures wherein:

FIG. 1 is a perspective view of the plant support;

FIG. 2 is a side elevation view of the plant support of FIG. 1;

FIG. 3 is a top plan view of the plant support of FIG. 1;

FIG. 4 is a perspective view of another embodiment of the plant support wherein the bottom loop is triangular;

FIG. 5 is a side elevation view of the plant support of FIG. 4; and

FIG. 6 is a top plan view of the plant support of FIG. 4.

DETAILED DESCRIPTION OF THE INVENTION

FIG. 1 shows the components of the plant support 20 of the present invention. The plant support 20 is comprised of a plurality of horizontal members 22 and a plurality of vertical members 24.

In the preferred embodiment, the vertical members 24 have opposite top and bottom ends 26, 28 that define the length of the vertical members therebetween. The bottom ends 28 are adapted to engage with and penetrate into the earth to anchor the plant support 20 to the earth. While the bottom ends 28 of the vertical members 24 are shown as being flat, it should be understood that the bottom ends 28 can be pointed or sharp to facilitate insertion into the earth without departing from the scope of the invention.

In the preferred embodiment, the plurality of horizontal members 22 are five closed loops 30, 32, 34, 36, 38. In FIGS. 1–3 the closed loops 30, 32, 34, 36, 38 are shown as being rings. However, as was discussed above, the term closed loop is not to be interpreted as restricting the horizontal members 22 to rings or ring-type configurations. Rather, the term loop, as used herein, has a broader definition. For example, the horizontal members 22 could be configured in the shape of a square or a triangle (as shown in FIGS. 4–6) with a central opening and still be within the definition of a closed loop.

In the preferred embodiment, the plurality of closed loops 30, 32, 34, 36, 38 are vertically spaced apart and are attached to the vertical members 24 between the vertical member top and bottom ends 26, 28. The bottom loop 30 is the loop attached to the vertical members 24 closest to the vertical member bottom ends 28. The top loop 38 is the loop attached to the vertical members 24 closest to the vertical member top ends 26. The plurality of horizontal members 22 all have central openings 40. The central openings 40 are dimensioned to allow a plant to grow through the central openings 40 and be supported by the horizontal members 22. The horizontal members 22 are progressively larger as the horizontal members 22 are vertically spaced along the length of the vertical members 24 from the vertical member bottom ends 28 to the vertical member top ends 26. The smallest horizontal member is the bottom loop 30 and the largest horizontal member is the top loop 38. As the horizontal members 22 increase in size, their respective central openings 40 also increase in size. In the embodiment of FIGS. 1–3 all the central openings 40 are circular and have an increasing diameter as the horizontal members are vertically spaced along the vertical members 24 from the vertical member bottom ends 28 to the vertical member top ends 26. The central opening diameter of the bottom loop 30 is the smallest central opening diameter and the central opening diameter of the top loop 38 is the largest central opening diameter. However, it is to be understood that neither the horizontal members 22 nor the central openings 40 need to be increasing in size as they are vertically spaced along the length of the vertical members 24 to be within the scope of the invention. In the preferred embodiment, the horizontal members 22 are concentric about a common vertical central axis 42 as can best be seen in FIGS. 3 and 6. In the preferred embodiment, the closed loops 30, 32, 34, 36, 38 have differing vertical cross-sectional diameters. The vertical cross-sectional diameter of the bottom loop 30 is larger than the vertical cross-sectional diameters of the other closed loops 32, 34, 36, 38.

The plurality of vertical members 24 extend upwardly generally parallel to the common vertical central axis 42 from their bottom ends 28 to the bottom loop 30. The vertical members 24 then diverge radially outwardly from the common vertical central axis 42 as the vertical members 24 extend upwardly from the bottom loop 30 to their top ends 26. The angle at which the vertical members 24 diverge from being parallel to the common vertical central axis 42 is dependent upon the size of the closed loops 32, 34, 36, 38 above the bottom loop 30. However, it is to be understood that because the horizontal members 22 do not need to be increasing in size as they are vertically spaced along the length of the vertical members 24 to be within the scope of the invention, the vertical members 24 do not need to diverge radially outwardly as they extend upwardly from the bottom loop 30 towards their top ends 26 to be within the scope of the invention. Without restricting the invention to specific dimensions, the applicant has found that the closed loops 30, 32, 34, 36, 38 work well when their central openings 40 are 9", 12", 14¼", 16¼", and 19" in diameter respectively. The vertical members 24 would then diverge radially outwardly from the vertical central axis 40 at approximately six degrees. While the invention is not limited to the above recited dimensions, as other dimensions will also work depending on plant size, the applicant has found these dimensions to be preferable.

Preferably, the vertical members 24 have cross-sectional diameters that are the same as the vertical cross-sectional diameter of the bottom loop 30. However, it is not required that the vertical cross-sectional diameter of the bottom loop 30 be the same as the cross-sectional diameters of the vertical members 24. By sizing the vertical cross-sectional diameter of the bottom loop 30 and the cross-sectional diameters of the vertical members 24 larger than the vertical cross-sectional diameters of the closed loops 32, 34, 36, 38, the invention is capable of being dimensioned and adapted to penetrate into and engage with the earth when the bottom loop 30 is stepped on by a user without deforming the vertical members 24 or the horizontal members 22. In the preferred embodiment, the vertical cross-sections of the horizontal members 22 are circular and the cross-sections of the vertical members 24 are also circular. However, it is to be understood that these cross-sections do not need to be circular to be within the scope of the invention.

By having the vertical cross-sectional diameters of the closed loops 32, 34, 36, 38 differing from the cross-sectional diameter of the bottom loop 30, the plant support 20 can be designed to be structurally strong enough to have the vertical member bottom ends 28 penetrate into and engage with the earth when the bottom loop 30 is stepped on by a user without increasing the cost of production as much as would be required if all of the components of the plant support 20 were made with the same, larger cross-sectional diameter. By having the vertical members 24 extend upwardly generally parallel to the vertical central axis 42 from their bottom ends 28 to the bottom loop 30, the insertion of the vertical member bottom ends 28 into the ground is facilitated. This upright, vertical orientation of the vertical member bottom ends 28 also facilitates their insertion into the ground without bending. If the vertical members 24 were to diverge radially outwardly from the vertical central axis 42 as they extended upwardly from their bottom ends 28 to the bottom loop 30, like the remainder of the vertical members 26, the vertical member bottom ends 28 would be more difficult to insert into the ground.

In another preferred embodiment, as shown in FIGS. 4–6, the bottom loop 30 is a triangular bottom loop 44. The triangular bottom loop 44 shares the same common vertical central axis 42 as the closed loops 32, 34, 36, 38. In this embodiment, the triangular bottom loop 44 also has a circular cross section with a diameter that is larger than the diameters of the closed loops 32, 34, 36, 38.

In the preferred embodiment, the vertical members 24 and horizontal members 22 are made from metal. Preferably the plurality of vertical members 24 and the bottom loops 30, 44 are made from ⅜" diameter reinforcing rod while the closed loops 32, 34, 36, 38 are made from ¼" diameter hot rolled steel. However, it is to be understood that while the dimensions and type of metal recited are preferable, they should in no way limit the scope of the invention as defined by the claims. The important feature is that the bottom loops 30, 44 have a cross-sectional diameter that is larger than the cross-sectional diameters of the other closed loops 32, 34, 36, 38. Another important feature is that the bottom loop 30, 44 is constructed of a material that is substantially stiffer and more rigid than the other closed loops 32, 34, 36, 38. These two important features collectively and individually enable the plant support 20 to be inserted into the ground by a user stepping on the bottom loop 30, 44 without deforming the plant support 20 nor needlessly increasing the cost of the plant support by making the closed loops 32, 34, 36, 38 with the same larger cross-sectional dimensions and the same material of construction as the bottom loops 30, 44.

As can be seen in FIGS. 3 and 6, the plurality of vertical members 24 are spaced equally around the common vertical central axis 42. However, it is to be understood that the vertical members 24 do not need to be equally spaced around the common vertical central axis 42. Additionally, while the preferred embodiments are shown as containing three vertical members 24 and five horizontal members 22, it is to be understood that any number of vertical members 24 and horizontal members 22 can be employed without departing from the scope of the invention.

In use, a user of the plant support 20 would position the plant support 20 over a plant desired to be supported with the vertical member bottom ends 28 in contact with the soil in which the plant is growing. The user would then step on the bottom loop 30, 44 and shift their weight to the bottom loop 30, 44. The pressure exerted on the bottom loop 30, 44 would then be transferred to the vertical members 24 and cause the vertical member bottom ends 28 to penetrate into the soil and anchor the plant support 20 to the soil so that the plant can grow upwardly through the central openings 40 and be supported by the plurality of horizontal members 22.

While the present invention has been described by reference to specific embodiments, it should be understood that modifications and variations of the invention may be constructed without departing from the scope of the invention as defined by the following claims.

What is claimed is:

1. A plant support comprising:
   at least one vertical member having opposite top and bottom ends defining a length therebetween, the bottom end being adapted to engage with and penetrate into the earth;
   at least one horizontal member, the horizontal member being a rigid closed loop attached to the vertical member between the top and bottom ends, said closed loop having a central opening dimensioned to allow a plant to grow through the central opening and be supported by said closed loop, said closed loop being dimensioned and adapted and attached to the at least one vertical member at a position close to the bottom end where it can be used to cause the vertical member bottom end to penetrate into and engage with the earth when said closed loop is stepped on by a user to thereby anchor the plant support to the earth and provide a support for the plant;
   the at least one horizontal member is one of a plurality of horizontal members, the horizontal members being arranged in a vertically spaced relation along the length of the at least one vertical member between the top and bottom ends, the plurality of horizontal members includes a bottom horizontal member being closest to the bottom end of the at least one vertical member and a top horizontal member being closest to the top end of the at least one vertical member;
   the plurality of horizontal members are rings that are concentric around a common vertical central axis; and
   each ring has a vertical cross-sectional diameter and the cross-sectional diameter of the bottom ring is larger than the cross-sectional diameters of the other rings.

2. The plant support of claim 1, wherein:
   the plurality of horizontal rings have progressively differing central opening diameters, the central opening diameters of the rings increasing as the rings are arranged along the length of the at least one vertical member with the bottom ring having a smallest central opening diameter and the top ring having a largest central opening diameter.

3. The plant support of claim 1, wherein:
   the at least one vertical member is a plurality of vertical members, the vertical members being spaced around the vertical central axis with each ring being attached to each vertical member.

4. The plant support of claim 3, wherein:
   each vertical member is a rod with a cross-sectional diameter that is generally the same as the cross-sectional diameter of the lowest ring.

5. The plant support of claim 3, wherein:
   the vertical members extend upwardly generally parallel to the vertical central axis from their bottom ends to the bottom ring and then diverge radially outwardly from the vertical central axis as the vertical members extend upwardly from the bottom ring to their top ends.

6. A plant support comprising:
   at least one vertical member having opposite top and bottom ends defining a length therebetween, the bottom end being adapted to engage with and penetrate into the earth;
   at least one horizontal member, the horizontal member being a rigid closed loop attached to the vertical member between the top and bottom ends, said closed loop having a central opening dimensioned to allow a plant to grow through the central opening and be supported by said closed loop, said closed loop being dimensioned and adapted and attached to the at least one vertical member at a position close to the bottom end where it can be used to cause the vertical member bottom end to penetrate into and engage with the earth when said closed loop is stepped on by a user to thereby anchor the plant support to the earth and provide a support for the plant;
   the at least one horizontal member is one of a plurality of horizontal members, the horizontal members being arranged in a vertically spaced relation along the length of the at least one vertical member between the top and bottom ends, the plurality of horizontal members includes a bottom horizontal member being closest to the bottom end of the at least one vertical member and a top horizontal member being closest to the top end of the at least one vertical member;
   the plurality of horizontal members are comprised of a generally triangular member and a plurality of rings, the triangular member and the rings sharing a common vertical central axis, and a bottom one of the horizontal members being the triangular member; and,
   the plurality of rings and the triangular member have circular vertical cross-sections, a cross-sectional diameter of the triangular member being larger than cross-sectional diameters of the rings.

7. The plant support of claim 6, wherein:
   the at least one vertical member is a plurality of vertical members, the vertical members being spaced around the central axis with each horizontal member being attached to each vertical member, the vertical members extending upwardly generally parallel to the central axis from their bottom ends to the triangular member and then diverging radially outwardly from the central axis as the vertical members extend upwardly from the triangular member to their top ends.

8. A plant support comprising:

at least one vertical member having opposite top and bottom ends defining a length therebetween, the bottom end being adapted to engage with and penetrate into the earth to anchor the plant support to the earth; and at least two horizontal members, the horizontal members having differing vertical cross-sectional diameters, the horizontal members being vertically spaced apart and attached to the vertical member along the length of the vertical member, the horizontal member attached to the vertical member closest to the bottom end being a bottom horizontal member and having a largest vertical cross-sectional diameter, the horizontal member attached to the vertical member closest to the top end being a top horizontal member, the horizontal members having a central opening dimensioned to allow a plant to grow through the central opening and be supported by said horizontal members, and the bottom horizontal member being dimensioned and adapted to cause the vertical member bottom end to penetrate into and engage with the earth when the bottom horizontal member is stepped on by a user to thereby anchor the plant support to the earth and provide a support for the plant.

9. The plant support of claim 8, wherein:

the at least two horizontal members are closed loops.

10. The plant support of claim 9, wherein:

the central openings of the at least two closed loops have a common vertical central axis and are progressively larger as the loops are vertically spaced along the length of the vertical member from the bottom end to the top end, the bottom loop having a smallest central opening and the top loop having a largest central opening.

11. The plant support of claim 10, wherein:

the at least one vertical member is a plurality of vertical members, the vertical members being spaced around the common vertical central axis with each loop being attached to each vertical member, the vertical members extending upwardly generally parallel to the central axis from their bottom ends to the bottom loop and then diverging radially outwardly from the central axis as the vertical members extend upwardly from the bottom loop to their top ends.

12. The plant support of claim 11, wherein:

the at least two horizontal members are two of a plurality of horizontal members and the horizontal members are rings that are concentric around the common vertical central axis.

13. The plant support of claim 12, wherein:

the plurality of vertical members are rods with a cross-sectional diameter and the bottom ring cross-sectional diameter is the same as the cross-sectional diameter of the vertical members.

14. The plant support of claim 11, wherein:

the at least two horizontal members are two of a plurality of horizontal members, the horizontal members being comprised of a generally triangular member and a plurality of rings, the triangular member and the plurality of rings sharing the common vertical central axis, and the triangular member being the bottom horizontal member.

* * * * *